Dec. 21, 1943.  D. F. GEIGER  2,337,096
PRESSURE OPERATED TOOL CONNECTOR
Filed Oct. 26, 1942
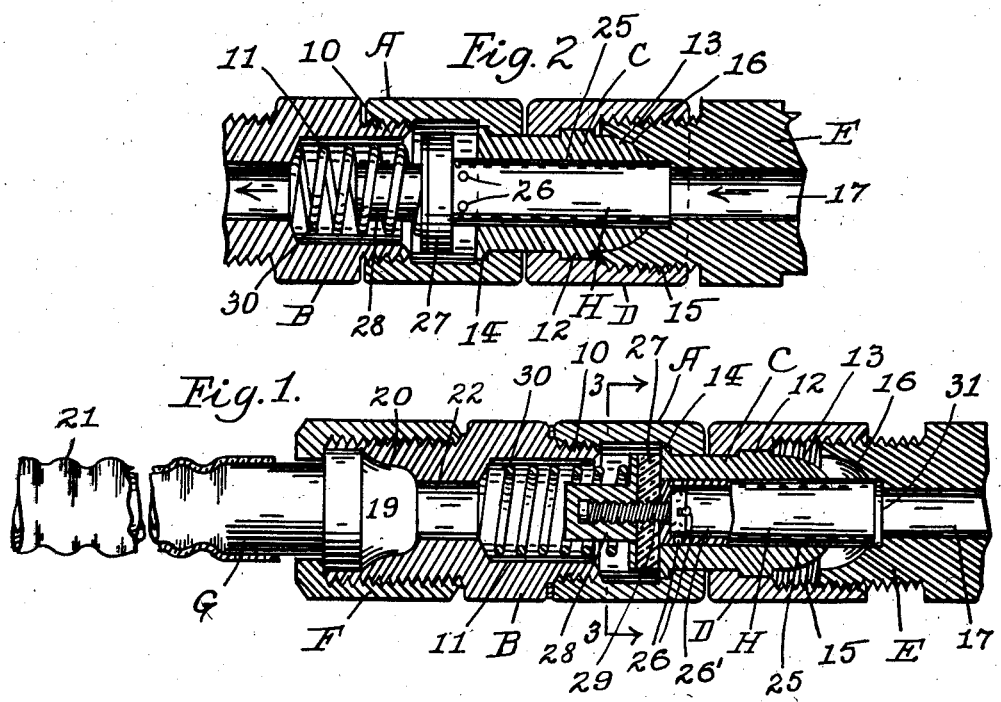
INVENTOR.
David F. Geiger,
BY
Attorney Patented Dec. 21, 1943

2,337,096

UNITED STATES PATENT OFFICE 2,337,096

PRESSURE OPERATED TOOL CONNECTOR

David F. Geiger, Los Angeles, Calif.

Application October 26, 1942, Serial No. 463,355

2 Claims. (Cl. 284—19)

The primary object of this invention is to provide a connector which will automatically close a supply duct, by which fluid under pressure is normally supplied to a fluid operated tool, when the latter is disconnected from said supply duct, or which will automatically open the supply duct by the act of reconnecting the tool. By the use of my invention the tool can be easily and quickly operatively connected with or detached from said duct without operating any additional valves as heretofore, or when the tool is connected with a fluid supply system by which a number of tools are operated simultaneously, each tool can be connected or disconnected without interfering with the operation of other tools in the system.

A particular but not exclusive use for the improvement is in the welding art where a great many welders or burners are working on a job, such as ship building and repairing, and where it is usual practice to have acetylene and oxygen tanks, or manifolds, as the case may be, a considerable distance away, thus frequently requiring hundreds of feet of hoses which have to be traced out and the valves operated at the tank or tanks whenever a torch or burner is connected or disconnected. This operation is frequently very confusing and burdensome, as the hoses have to be traced to make sure of opening or closing the right valve, thus resulting in loss of time, uncertainty and hazard. By the use of my improvement the operators can work until time to quit and immediately disconnect their torches or burners and the next operators connect their tools and immediately start work without delay, confusion, or loss of production or operator's time.

Among further objects of the invention are simplicity and inexpensive construction, the saving of time and expense, and greater effectiveness in use. Other advantages will appear from the following description and the drawing forming part thereof, in which Fig. 1 is a central longitudinal section of my improved connector, showing part of the adapter of a fluid operated tool in partly removed position and the automatic check valve closed; Fig. 2 is another central longitudinal section of part of the structure shown in Fig. 1, illustrating the adapter of the fluid operated tool fully connected and the check valve positively opened, and Fig. 3 is a cross section taken on the line 3—3 of Fig. 1.

In the drawing, A indicates a service body of my improved connector, which has a companion nipple such as B engaged by the threaded end 10 in the fluid receiving end thereof and cooperating therewith to provide a pressure fluid valve chamber 11 therein. The end of the service body opposite that in which the nipple is secured is provided with a forwardly extending cylindrical nozzle C, preferably although not exclusively composed of relatively hard material such as Monel metal to withstand hard use and prevent wear and corrosion. This nozzle has an annular shoulder 12 near its forward end and a tapering annular seat 13 on its fluid delivery extremity and is secured rigidly in the service body A by brazing at 14. A female coupling D is swiveled freely and retained on the nozzle by the shoulder 12. The forward end of the female coupling D is internally threaded at 15 to receive and engage the threaded adapter constituting a male coupling element such as E of any fluid operated tool (not shown).

The tool adapter E has a suitable socket 16 in its service end, the wall of which cooperates with the annular seat 13 on the forward end of the nozzle when the adapter E is secured firmly in the coupling D, to provide a fluid tight connection. The tool adapter also has a longitudinal duct 17 therein for conducting the operating fluid from the connector to the fluid operated tool.

The rearwardly extending end 18 of nipple B is externally threaded to engage with an internally threaded union F. This union serves to secure the usual hose coupling stem G with its head 19 seated tightly in a socket 20 in the nipple B. Fig. 1 shows a portion of the usual hose 21 leading to the source of compressed fluid such as air, gas or liquid supplied to the fluid operated tool but it will be understood that any suitable type of connection can be provided in the fluid supply end of my improved connector. The nipple B is passaged at 22 to provide a connection between the hose coupling and the valve chamber 11.

My improved check valve with which my improved connector is provided resembles a sleeve H which is closely fitted in and freely reciprocable longitudinally in the cylindrical bore 25 through the nozzle C. The rearward end of the valve sleeve has laterally extending port openings 26 leading from within, which are closed by the bore 25 of the nozzle in the forward closed position of the valve as shown in Fig. 1. In the open position of the valve shown in Fig. 2, the valve sleeve is projected into the valve chamber back of the inner end of the nozzle, thus opening the ports and admitting fluid under pressure from the hose through the longitudinal egress duct 26' in the valve sleeve and through duct 17 in the fluid actuated tool adapter.

The rearward end of the valve sleeve H is provided with a seal which acts as a stop to limit the forward reciprocable closing movement of the valve sleeve and consists of a resilient washer 27 clamped to the rearward end of the valve sleeve by the flanged stud 28 and a screw 29 through the inner end of the sleeve and threadedly secured to the stud. The washer functions to seal the joint between the valve sleeve and the bore of the nozzle to prevent any possible fluid leakage when the check valve is closed. The pressure of fluid in the valve chamber tends to close the check valve automatically and this functioning is augmented positively by a helical expansion spring 30 which is compressed and held in the valve chamber with its forward end encircling the stud 28 and pressing against the inner surface of the flange on the stud, and the rearward wall of the valve chamber.

Normally, that is in the closed position of the check valve, when the fluid operated tool is disconnected, the valve sleeve H projects forwardly as a stem beyond the nozzle C. As the fluid operated tool is coupled by its adapter E to the female coupling D, an inner shoulder 31 in the socket 16 of the adapter E impinges against the forward end of the valve sleeve or stem and automatically depresses the valve from closed position as shown in Fig. 1 into the open position shown in Fig. 2. Vice versa when the fluid operated tool is uncoupled by unscrewing, the valve automatically closes the ports 26 and the egress duct 26' through the valve sleeve.

The invention thus provides a simple and effective structure whereby the precise functioning of the valve is assured under exacting conditions and a tight closure is effected when the fluid actuated tool is disconnected. The swivel joint provided by the nozzle C and by which the coupling D can be turned or held while the operator's tool is being connected assists in effectively providing a fluid tight connection with the fluid operated tool and facilitates the handling of fluid operated tools without rendering other portions of a fluid actuating system ineffective. As shown the various connecting elements such as A, B, D and F are of hexagonal external shape as shown at 32 in Fig. 3, to be engaged by a wrench or other tool used when tightening or disconnecting the parts. This hexagonal shape may however be modified and made in any suitable shape such as circular or having any number of flat sides, within the spirit of the invention. As there are no objectionable projections from my improved connector there is substantially nothing to catch and interfere with the use of the device. By making the nozzle C out of Monel metal or other comparatively hard material, the device is protected from injury and wear caused by the frequent connecting or disconnecting of the fluid actuated tool and assures a close working fit. The hard material resists compression of the sleeve or plunger H and it assures free reciprocable movement of the sleeve valve at all times.

In accordance with the patent statutes, I have described the principles of operation of my invention together with the apparatus which I now consider to represent the best embodiment thereof, but I desire to have it understood that the construction shown is only illustrative and that the invention can be carried out by other means and applied to uses other than those above set forth within the spirit thereof and without departing from the scope of the following claims.

I claim:

1. A connector for a fluid actuated tool, comprising, a service body having means for connecting rearwardly with a source of fluid under pressure and containing a valve chamber, a nozzle of hard wear resisting material swiveled on and projecting forwardly from the service body and having a bore connected with said valve chamber and a forwardly tapering external bearing seat on its forward extremity, a female coupling swiveled freely over the external forward portion of said nozzle, a tool adapter to be connected by said coupling having a rearward tapering seat corresponding with the external seat on said nozzle to provide a tight socket connection between the adapter and nozzle and an inner annular shoulder in proximity to said seat, a sleeve freely reciprocable longitudinally in the bore of said nozzle with its forward end engaged by said shoulder to be depressed and having a port opening in its rearward portion entering the valve chamber in the depressed position of said sleeve, a valve movably mounted upon the inner end of said sleeve adapted to close over the inner end of said nozzle and the joint between the nozzle and sleeve to produce a fluid tight seal, and means in the valve chamber bearing against said valve tending to normally close the valve when the adapter is disconnected.

2. A connector for a fluid actuated tool, comprising, a service body having means for connecting with a source of fluid under pressure, a valve chamber therein and a nozzle projecting forwardly therefrom, said nozzle having a longitudinal bore normally disconnected from said chamber and a forwardly tapering external annular seat on its forward end, a threaded coupling element swiveled on the external forward portion of said nozzle, a forwardly urged connecting sleeve reciprocable in and projecting forwardly beyond the nozzle normally closing said bore and adapted to connect with said chamber when the sleeve is urged rearwardly into said nozzle, a disk valve detachably secured on the inner end of said sleeve and closing against the inner end of said nozzle to normally interrupt said connection with said valve chamber, and a tool adapter having an externally threaded nipple for connection by said coupling element, an inner annular seat corresponding with and adapted to close over the external seat on said nozzle to produce a tight connection, and an annular shoulder below said seat and within said nozzle corresponding with the forward end of said sleeve to depress the latter and open said valve when the adapter is fully connected with said coupling element.

DAVID F. GEIGER.